UNITED STATES PATENT OFFICE.

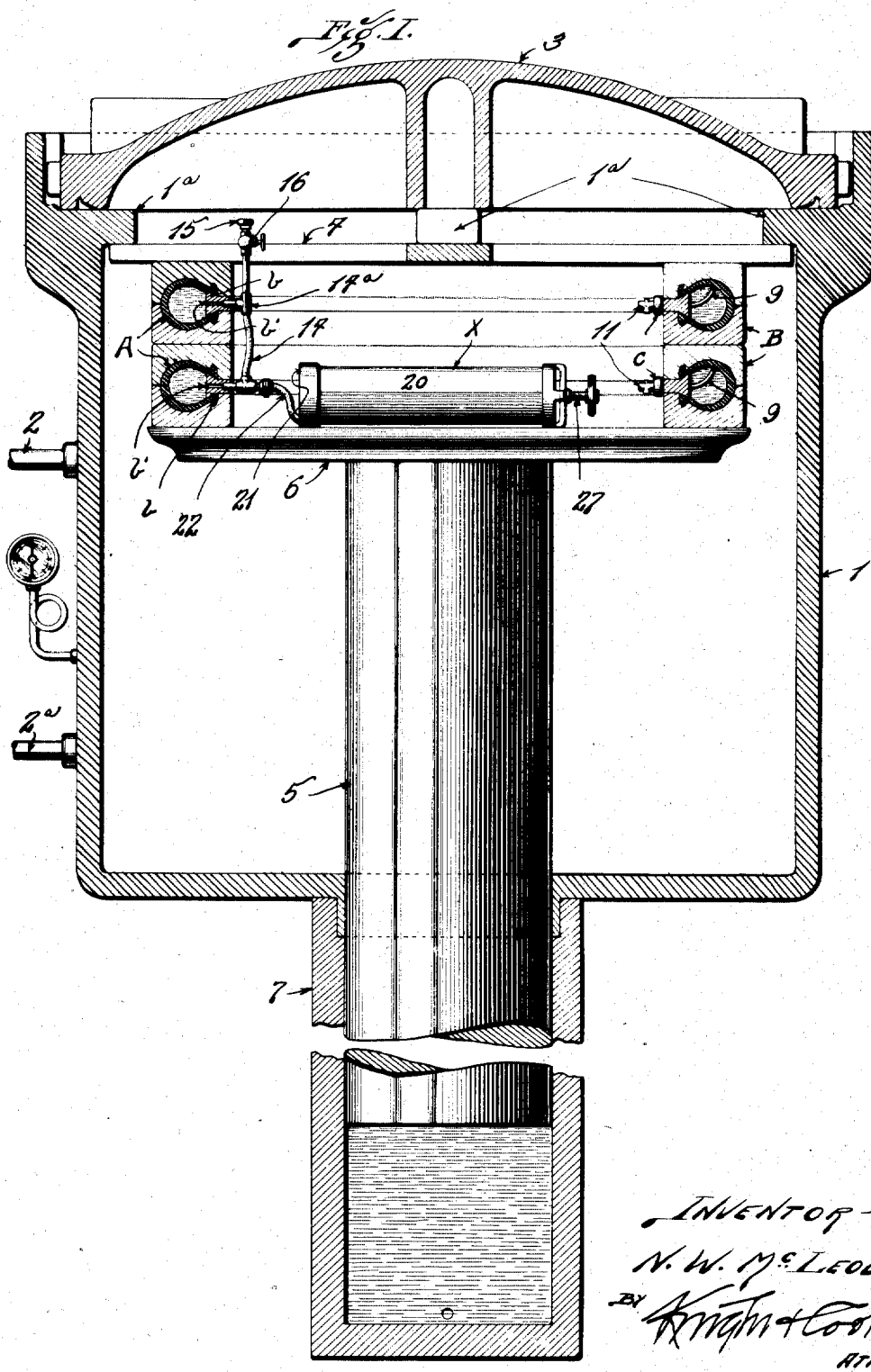

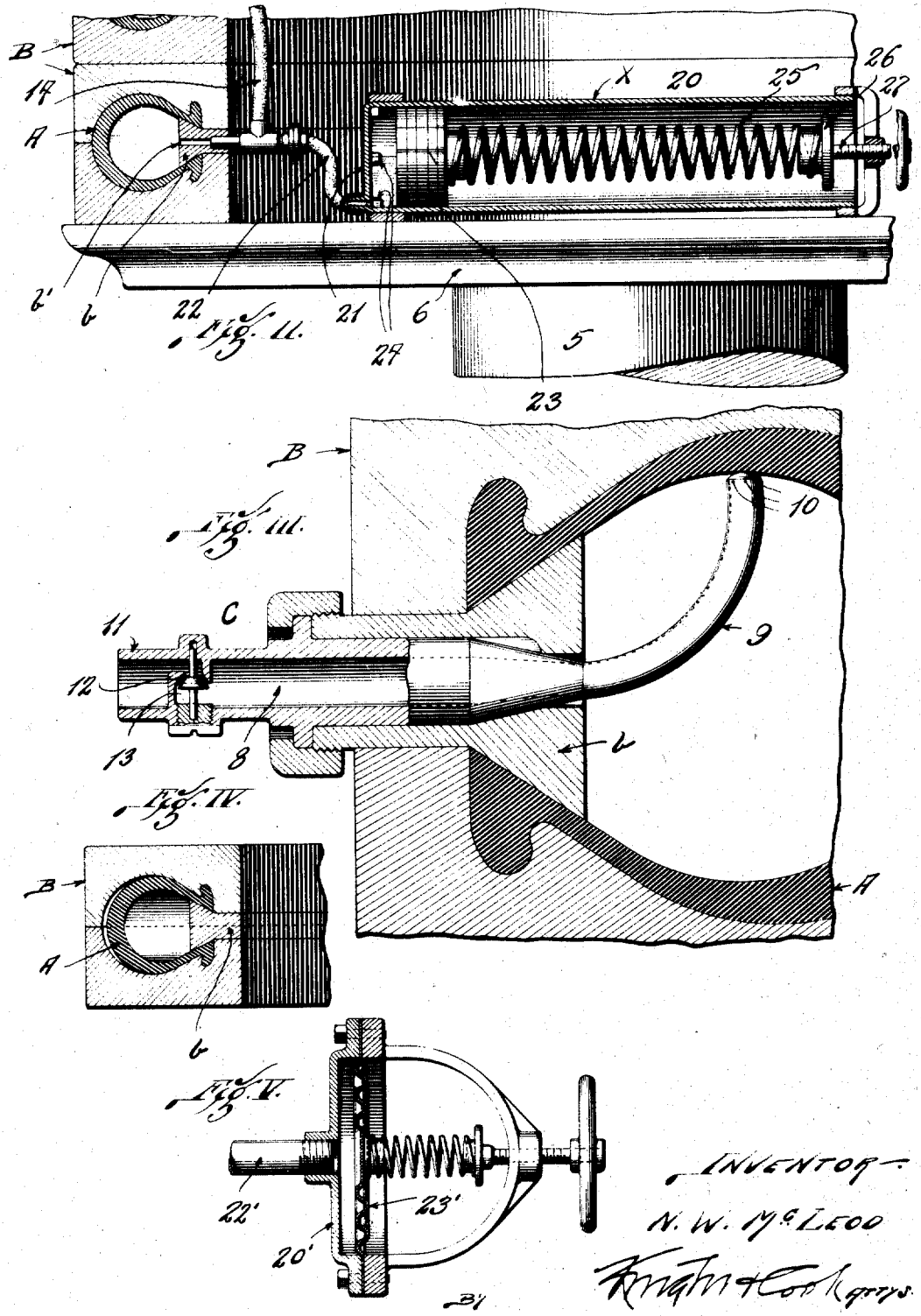

NELSON W. McLEOD, OF ST. LOUIS, MISSOURI, ASSIGNOR TO AMERICAN MOTORS TIRE COMPANY, OF DETROIT, MICHIGAN, A CORPORATION OF MICHIGAN.

APPARATUS FOR FORMING AND VULCANIZING RUBBER ARTICLES.

1,213,223.     Specification of Letters Patent.     Patented Jan. 23, 1917.

Application filed May 4, 1916. Serial No. 95,336.

*To all whom it may concern:*

Be it known that I, NELSON W. McLEOD, a citizen of the United States of America, a resident of the city of St. Louis, State of Missouri, have invented certain new and useful Improvements in Apparatus for Forming and Vulcanizing Rubber Articles, of which the following is a full, clear, and exact description, reference being had to the accompanying drawings, forming a part of this specification.

My invention relates to a vulcanizing apparatus providing for the use of internal fluid pressure within a mold and against the rubber article to be vulcanized, in order that such article may be held under uniform pressure at every point against the internal wall of the mold during the period of vulcanization. Vulcanizing apparatus of this kind are especially useful in vulcanizing hollow rubber tires such as pneumatic tires or casings for automobiles.

Numerous efforts have heretofore been made to provide a vulcanizing apparatus using fluid pressure for the distention of the rubber articles in the vulcanizing molds, the originators of such apparatus proposing to utilize fluid agents of various natures, for example, steam or air, or water which will be turned to steam when heated within the rubber articles. The use of fluids of these mentioned kinds is objectionable for different reasons, principally because they permeate the structure to be vulcanized, or because they fail to vulcanize the structure uniformly at all points throughout the body of rubber. Consequently, the prior apparatus have not proven entirely satisfactory from a commercial standpoint.

The object of the present invention is to provide a vulcanizing apparatus which permits of the use of absolute hydraulic pressure against the rubber articles being vulcanized, without any liability of the water made use of for the hydraulic pressure being converted into steam, and with avoidance of the presence of air or steam in conjunction with the hydraulic pressure medium within the rubber article being vulcanized. Water alone is the ideal substance for use as a pressure medium in an apparatus of this kind and it is a well known fact that the presence of steam or air in conjunction with water as medium to afford internal pressure within rubber articles to be vulcanized is objectionable owing to permeation thereby into the rubber articles and to the inability of transferring heat with relative uniformity through solid bodies and gaseous bodies.

Difficulty has been experienced in discovering a way of maintaining a strict hydraulic pressure within the rubber articles to be vulcanized, so that permeation would be avoided and the conductivity of the internal fluid pressure medium would be constantly uniform at all points.

My present invention is preferably carried out in a construction whereby I eliminate air from the interior of the rubber article to be vulcanized fill the article with water and afford no opportunity for the generation of steam within the rubber articles as will hereinafter appear. To accomplish these results the water confined in the mold is preferably held under such a high degree of pressure that it will not boil when subjected to the vulcanizing temperature, which for example may be 270°. However, the water will expand as the temperature rises and the pressure due to the expansion is very great. I compensate for this expansion and prevent injury to the mold and rubber article, preferably by the use of a device which allows the water to expand without materially changing the pressure, at the same time maintaining the rubber article entirely full of water during the vulcanizing operation.

Figure I is a vertical section through my vulcanizing apparatus. Fig. II is an enlarged fragmentary section showing the expansion device. Fig. III is an enlarged cross section through one of the molds and the air vent device mounted therein. Fig. IV is an enlarged cross section through one of the molds, showing an unvulcanized tire therein as it appears prior to the introduction of hydraulic pressure into the tire. Fig. V is a view partly in section, illustrating a modification.

In the drawings, I have illustrated my apparatus of preferred construction, with the article to be treated shown as rubber tires, designated A, the tires having two edges at their inner circles and being built up of fabric and rubber compound, in any suitable manner. The tires A may be arranged in molds made of fabric, metal or any other suitable material and to illustrate a preferred form of the invention I have shown the tires incased within sectional molds B, each mold including, in addition to shell sections, an abutment ring b, which is situated between the edges at the inner circle of the tire when the built up raw tire is placed within the mold, to remain in such position throughout the treatment of the tire. The abutment ring, by its position between the edges of the tire, permits of the tire edges being tightly clamped between said abutment ring and the shell sections of the mold to produce fluid tight joints, in order that water introduced into the tire occupying the mold cavity, may be retained therein for the treatment of the tire.

1 designates a vulcanizer pot, through which steam is circulated, the pot, with this object in view, having connected to it pipes 2 and 2ª, one of which serves to admit live steam to the pot and the other of which allows the steam to escape from the pot. The vulcanizer pot has a closure 3, which may be held in closed position by any suitable means, access to the pot being permitted by moving, either the body of the pot or the closure relative to the other part of the pot. The vulcanizer pot is arranged to receive an abutment spider 4 beneath which the molds B are confined as will be presently pointed out. This abutment spider preferably extends across the vulcanizer pot and portions of it are positioned beneath lugs 1ª extending inwardly from the wall of the vulcanizer pot at its upper end.

5 designates a mold moving means in the form of a hydraulic ram provided with a head or table 6, the latter being situated within the vulcanizer pot and being movable therein. The ram head 6 serves as a support for the molds B, and upon the movement of the ram and its head toward the opposing abutment spider 4 inserted after the molds have been put in place, the pressure exerted upon the sectional molds B causes the tires therein to be clamped within the molds between the mold sections and the abutment ring b to such degree as to render the joints of the mold fluid tight. Steam admitted into the vulcanizer pot is, therefore, excluded from the molds. The hydraulic ram 5 is operable in a cylinder 7, into which water or other fluid is introduced.

I next come to a description of the means by which fluid may be conducted into the molds B, for the purpose of first fully expanding and compressing raw tires in said molds and, thereafter, vulcanizing the interior portions of the tires, while the exterior portions of the tires are being vulcanized from heat transmitted through the mold shells. It will, however, facilitate the description to first describe the automatic valve devices C, by which communication is established between the interiors of the molds and the vulcanizer pot to vent air from the tires within the molds prior to the delivery of water thereinto. Each valve device C comprises a tube 8 which extends through the abutment ring b of the mold, the said tube being provided at its inner end with a pipe 9 extending upwardly therefrom in the mold cavity so that its upper end terminates in proximity to the inner face of the tire A, the pipe 9 having in its wall, near its upper end, apertures 10 which provide for the admission of air from the interior of the tire to the upper end of the pipe. At the outer end of the tube 8 is a valve casing 11, containing a valve chamber 13 in which is a valve seat 12 and an air relief valve movable to and from said seat. Each of the abutment rings b of the molds B contains a duct b' through which water may be introduced into the tire A within the mold.

14 designates a water conducting pipe provided with as many connections 14ª as there are molds, said connections being of such construction as to permit of the ready application of the connections to the abutment rings of the molds at the ducts b'. Water is delivered to the water conducting pipe 14 from a hose or other pipe (not shown) which may be detachably connected to a coupling extension 15 of the water conducting pipe in which is a shut off valve 16.

In the practical use of my tire forming and vulcanizing apparatus for the treatment of tires composed of rubber compound and fabric, I proceed as follows: The tires having been built up in any suitable manner are placed in the molds B while the rubber compound is in the raw or uncured state, the abutment rings b of the molds being positioned between the edges of the tires so as to produce fluid tight joints at such edges. When the abutment rings b are put in place they contain the automatic air relief devices C having the check valves which are normally open.

The number of filled molds it is desired to use in the apparatus are placed one upon another with the lowermost mold resting upon the ram head 6. The abutment spider 4 is then inserted into the vulcanizer pot above the molds and in engagement with the lugs 1ª, thereby locking said abutment spider in such manner as to cause it to constitute a stop above the molds. The ram 5 is then elevated and the molds become clamped between the ram head and the abutment spider 4. The water conducting pipe 14 is then attached to the abutment rings b, and an expansion chamber X being attached to said water conducting pipe the apparatus is in condition for delivery of hydraulic pressure into the tires within the molds.

A water delivery pipe (not shown) is attached to the extension 15 of the water conducting pipe 14 and the shut-off valve 16 being open water is forced into the tires within the molds. As the water enters the tires the air therein escapes through the automatic valve devices C each of the valves being open a slight distance to allow the air to escape freely without closing the valve. After a tire has been completely filled with water, the water will begin to flow through one of the automatic valve devices and this liquid body striking the valve will force the latter to its seat, thus closing the automatic valve device. The vulcanizer pot is preferably open during the operation of filling the tires with water, the closure 3 being absent from the body of the pot. When the raw tires are first placed in the molds they do not necessarily fill the mold cavities, such cavities being preferably larger than the raw tires as illustrated in Fig. IV. The pressure under which the water is introduced into the tires is preferably one of a degree sufficiently high to expand the tires to the walls of the mold cavities, although a pressure slightly less than this may be sufficient for the reason that the hydraulic pressure in the tires will be increased when the water is heated by the heating of the vulcanizer pot in the manner to be hereinafter explained. When water is introduced into the tires of the molds B a certain quantity of the water enters the expansion chamber X, but inasmuch as this expansion chamber is a closed receptacle the water therein cannot escape and is held under pressure.

The tires having been filled with water to subject them to a desired degree of hydraulic pressure the shut-off valve 16 is then closed and the water delivery pipe is disconnected from the conducting pipe extension 15. The closure 3 is then secured to the body of the vulcanizer pot and the apparatus is in condition for service in the vulcanization of the tires. Heat is applied to the vulcanizer pot to perform the vulcanization by creating a circulation of steam through said pot, the steam entering the pot through the steam inlet pipe 2 and escaping therefrom through the outlet pipe 2$^a$. The steam in its circulation in the pot heats the molds B and the tires therein while said tires remain subjected to constant uniform hydraulic pressure. As the water in the tires becomes heated it will naturally expand and become greater in volume.

From the foregoing it will be understood that the tires have been filled with water which for various reasons is an excellent medium for the transmission of heat during the vulcanizing operation. The cold water introduced into the tires under pressure, will close the pores of the tires instead of permeating the rubber and fabric, and after the water has been heated to the desired degree its temperature will be substantially uniform throughout. Moreover, the uniformity of the temperature of the water will not be materially affected by external conditions, such for example as an open window at one side of the vulcanizer pot, and when heated the water will not permeate the structure to be vulcanized. There is, however, another condition that must be carefully observed to obtain the benefit of the foregoing advantages. The tires have been filled with water, and they are to remain full of water when subjected to the vulcanizing temperature, for a mixture of air and water, or steam and water, would not vulcanize the tires uniformly throughout, the conditions existing at the hot water being different from the conditions produced by hot air or steam. For these reasons I preferably prevent the water from turning to steam at a temperature of, for example, 270° F. and also avoid the extremely high degree of pressure which would be caused by the great expansive force of water when it is confined in a closed receptacle and heated from a normal temperature to 270° F.

The pressure of the water in the tires is preferably so high that the water will not boil when subjected to the vulcanizing temperature, and in the preferred form of the invention the water is allowed to expand into the expansion device X which relieves the pressure without permitting generation of steam in the tires, at the same time maintaining all of the tires full of water. To illustrate this feature of the invention I have shown a cylinder 20, closed at one end by a head 21 and connected to the water pipe 14 through the medium of a tube 22 and suitable coupling devices. A piston 23, mounted in this cylinder, is normally forced against an abutment 24 by means of a spring 25, the latter being interposed between the piston and a spring seat 26. The force of the spring may be regulated by an adjusting screw 27.

Some of the water introduced into the system enters the cylinder 20, and in response to the initial pressure of the water, for example 150 pounds, the piston travels a slight distance away from the cylinder head 21. If any leakage should occur in the system, the piston will be forced toward the head 21 to avoid a material reduction in the pressure of the water. When the water expands in response to the vulcanizing temperature, some of the water is forced into the cylinder 20 without injuring the tires or molds by the force of the expansion and without reducing the volume of the liquid bodies in the tires, the piston 23 being adapted to yield when the volume of water in the system is increased by expansion.

Fig. V illustrates a modification comprising an expansion chamber 20′ having a yieldable wall 23' in the form of a spring pressed diaphragm. A water conducting pipe 22', leading to the expansion chamber 20', is adapted to communicate with interior of the tires to be vulcanized. Some of the water introduced into the system will enter the expansion chamber 20' and when the water expands the diaphragm 23' will yield to permit the excess water to enter the expansion chamber.

I claim:—

1. In an apparatus for vulcanizing rubber articles, a mold, means for introducing water into said mold, means for heating the water in said mold, and means associated with said mold permitting the expansion of the water in the mold without permitting generation of steam in the mold.

2. In an apparatus for vulcanizing rubber articles, a mold, means for introducing water into said mold, means for heating the water in said mold, and means aside from said mold into which the water heated therein may expand without permitting generation of steam in the mold.

3. In an apparatus for vulcanizing rubber articles, a mold, means for introducing water into said mold, means for heating the water in said mold and a closed expansion chamber having communication with the interior of said mold.

4. In an apparatus for vulcanizing rubber articles, a mold, means for introducing water into said mold, means for heating the water in said mold, and an expansion chamber below the plane of said mold having communication with the interior of the mold.

5. In an apparatus for vulcanizing rubber articles, a sectional mold having an abutment member situated between its shell sections, means for introducing water into said mold through said abutment member, means for heating the water in said mold, and means having communication with the interior of said mold through said abutment member into which the water heated in said mold may expand without permitting the generation of steam in the mold.

6. In an apparatus for vulcanizing rubber articles, a plurality of molds, means for delivering water into said molds, means for heating the water in said molds, and an expansion chamber having communication with all of said molds in common into which a portion of the water in each mold may pass when heated without permitting the generation of steam in any of the molds.

7. In an apparatus for vulcanizing rubber articles, a mold, means for introducing water into said mold, means for heating the water in said mold, and a yieldable expansion device associated with said mold and adapted to move in response to the expansion of the water.

8. In a vulcanizing apparatus, a mold for the article to be vulcanized, means for introducing water into the article confined in the mold, means for heating the water in said article, and a yieldable expansion device associated with said mold and adapted to move in response to the expansion of the water, said yieldable expansion device permitting the expansion of water in the article without permitting generation of steam in said article.

9. In an apparatus for vulcanizing rubber articles, a mold, means for introducing water into said mold, means for heating the water in said mold, and an expansion device having a yieldable abutment adapted to be engaged by the water to provide for the expansion of the water in the mold.

10. In an apparatus for vulcanizing rubber articles, a mold, means for introducing water into said mold, means for heating the water in said mold, and an expansion chamber communicating with said mold, said expansion chamber being provided with a yieldable abutment, adapted to move in response to the expansion of the water.

11. In an apparatus for vulcanizing rubber articles, a mold, means for introducing water into said mold, means for heating the water in said mold, an expansion chamber associated with said mold, said expansion chamber being provided with a movable abutment wall, and a spring tending to prevent said abutment wall from moving in response to the pressure of the water, said abutment wall and spring being yieldable to allow water to escape from the mold in response to the expansion of the water in said mold.

12. In an apparatus for vulcanizing hollow rubber tires, a tire mold, means for introducing water into the tire confined in the mold, a venting device associated with said parts to allow the hollow tire to be filled with water, means for heating the water in the tire, and a yieldable expansion device permitting the expansion of the water in the tire.

13. In an apparatus for vulcanizing hollow rubber tires, a tire mold, a conductor through which water may be introduced into the tire confined in said mold, a venting device associated with said parts to allow the tire to be filled with water, means for closing the water receiving elements to maintain the tire full of water during the vulcanizing operation, means for heating said water, and a yieldable expansion device permitting the expansion of the water in the tire.

14. In an apparatus for vulcanizing hollow rubber tires having separable edges, a sectional tire receiving mold, an abutment member adapted to lie between the separable edges of the tire to prevent the escape of fluid at said edges, means for introducing water through said abutment member and into the hollow tire, a venting device associated with said parts to allow the hollow tire to be filled with water, means for closing the water receiving elements so that the tire will be full of water during vulcanizing operation, means for heating said water, and a yieldable expansion device permitting the expansion of the water in the tire.

15. In an apparatus for vulcanizing rubber articles, a plurality of molds, means for conducting water into said molds, means for heating the water in said molds, and a yieldable expansion device communicating with all of said molds, said expansion device being adapted to yield to compensate for the expansion of the water in said molds.

16. In an apparatus for vulcanizing rubber articles, a mold, means for introducing water into said mold, and a compensating device associated with said mold to compensate for leakage of water from the mold.

17. In an apparatus for vulcanizing rubber articles, a mold for the reception of the article to be vulcanized, means for introducing water into the article confined in the mold, means for heating the water in the article, and a compensating device arranged to compensate for leakage of water from the article, said compensating device being adapted to relieve the pressure due to the expansion of the water in the article.

NELSON W. McLEOD.

Copies of this patent may be obtained for five cents each, by addressing the "Commissioner of Patents, Washington, D. C."